(12) United States Patent
Jackson et al.

(10) Patent No.: US 7,674,564 B2
(45) Date of Patent: Mar. 9, 2010

(54) COLOR FILTER

(75) Inventors: Bruce J. Jackson, Star, ID (US);
Rodolfo Jodra-Barron, Boise, ID (US);
Philip S. Burkum, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1365 days.

(21) Appl. No.: 11/105,035

(22) Filed: Apr. 11, 2005

(65) Prior Publication Data

US 2006/0228637 A1    Oct. 12, 2006

(51) Int. Cl.
*G02B 5/20* (2006.01)

(52) U.S. Cl. .............................. 430/7; 430/31; 347/107

(58) Field of Classification Search ....................... None
See application file for complete search history.

(56) References Cited

U.S. PATENT DOCUMENTS 5,079,214 A    1/1992    Long et al.
6,077,634 A *  6/2000    Phillips ..................... 430/7
6,402,403 B1   6/2002    Speakman
6,439,687 B1   8/2002    Inoue
6,697,694 B2   2/2004    Mogensen
6,713,389 B2   3/2004    Speakman
6,827,424 B2   12/2004   Teshigawara

FOREIGN PATENT DOCUMENTS

JP    5-045513 A  *  2/1993
JP    8-062414 A  *  3/1996

OTHER PUBLICATIONS

Computer-generated translation of JP 8-062414 (Mar. 1996).*
Computer-generated translation of JP 5-045513 (Feb. 1993).*
Abstract of JP 8-062414 (Mar. 1996).*

* cited by examiner

*Primary Examiner*—John A. McPherson

(57) ABSTRACT

One embodiment of a color filter includes a substrate and a color filter pattern formed on the substrate, the color filter pattern including at least two, substantially identical patterned layers.

13 Claims, 2 Drawing Sheets

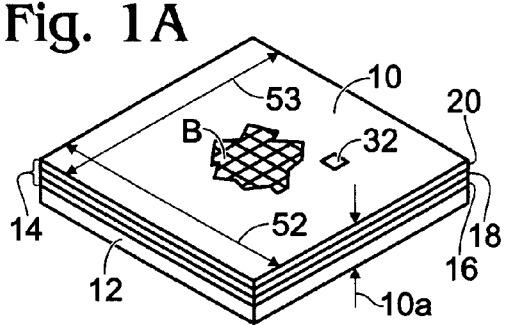
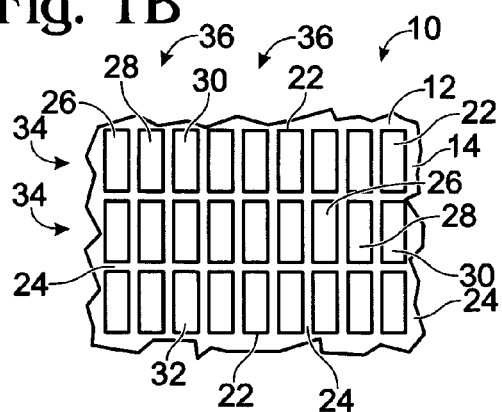
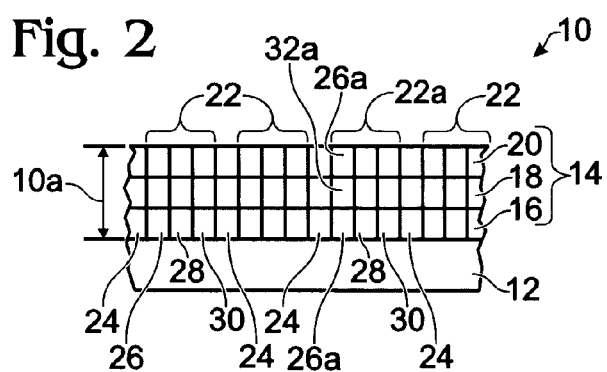
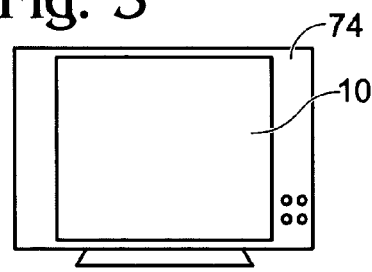
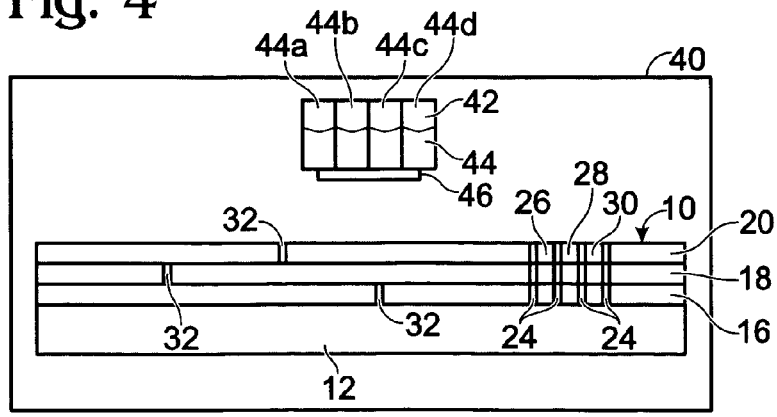

COLOR FILTER

BACKGROUND

Color filters may be used to display color images, such as on display devices including computer monitors, television sets and the like. Heretofore, color filters have been fabricated using a lithographic process wherein photosensitive materials are deposited on a substrate in a vacuum chamber. This fabrication process is time consuming, expensive, and may result in color filters having defects, including inadequate brightness or color inconsistency, such that the color filter may be discarded. Accordingly, it may be desirable to provide a color filter, and a method of manufacturing the same, that may be manufactured with reduced expensive and time, and may have a reduced number of defects.

BRIEF DESCRIPTION OF THE DRAWINGS

FIG. 1A is a schematic perspective view of one embodiment of a color filter.

FIG. 1B is a detailed top schematic view of region B of the color filter of FIG. 1A, showing one embodiment of a plurality of individual pixels of the color filter.

FIG. 2 is a schematic side partial cross-sectional view of one embodiment of a color filter including multiple layers of the color filter.

FIG. 4 is a schematic cross-sectional side view of another embodiment of a printer utilized for forming a color filter.

FIG. 5 is a schematic front view of one embodiment of an image display device that includes one embodiment of a color filter.

DETAILED DESCRIPTION OF THE DRAWINGS

Figure 3:
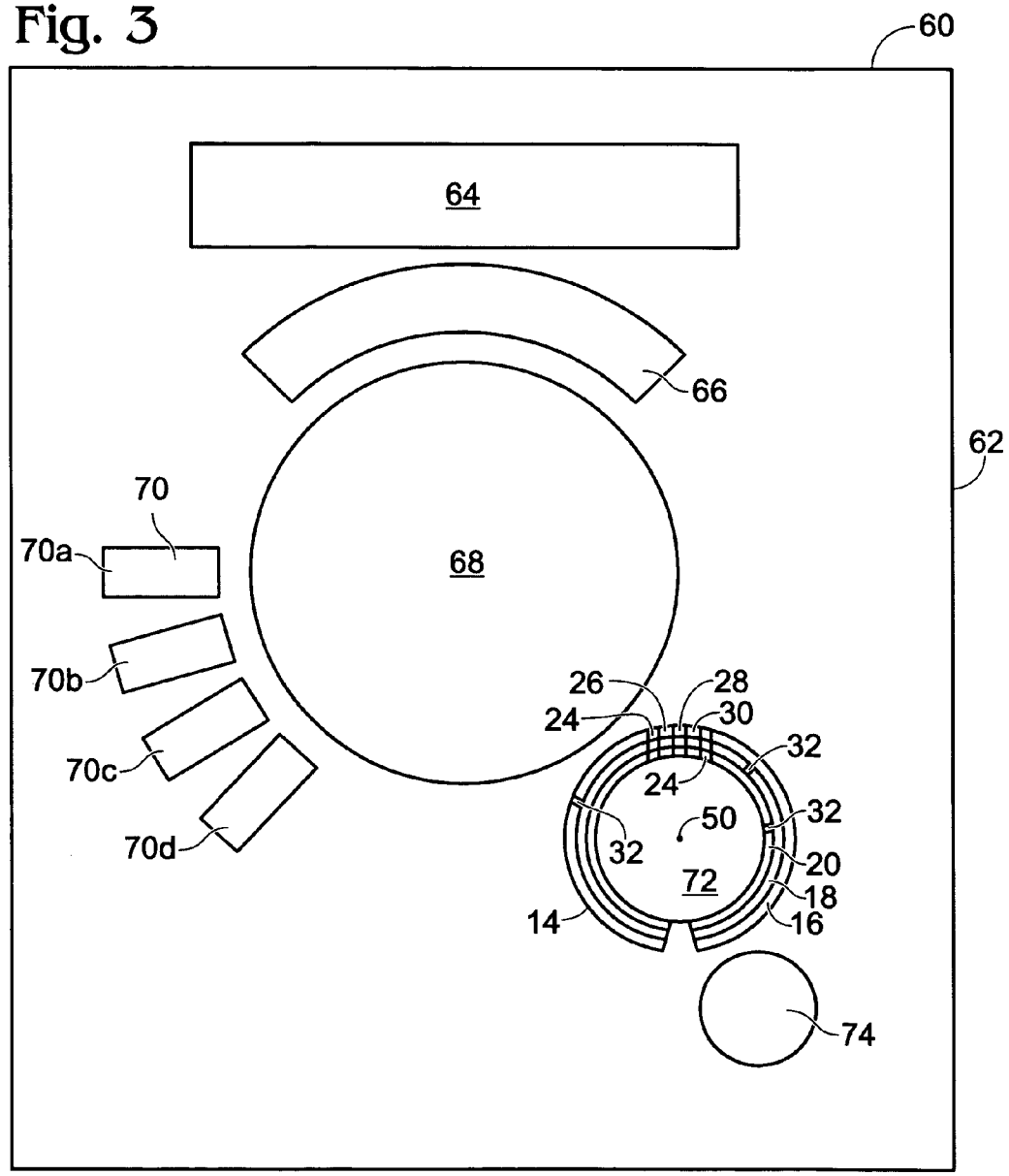
FIG. 3 is a schematic cross-sectional side view of one embodiment of a printer utilized for forming a color filter.

FIG. 1A is a schematic perspective view of one embodiment of a color filter 10 including a substrate 12 and a color pattern 14 formed thereon. Substrate 12 may be manufactured of glass, plastic, or any other suitable material. In the embodiment shown, color pattern 14 includes a first pattern layer 16, a second pattern layer 18, and a third pattern layer 20. Each of pattern layers 16, 18 and 20 may be redundant pattern layers formed sequentially on top of each other.

FIGS. 1B and 2 are a detailed top schematic view, and a schematic partial cross-sectional side view, respectively, of the color filter of FIG. 1A, showing one embodiment of a plurality of individual pixels 22 of color filter 10. Each of pixels 22 and subpixels 26, 28 and 30 may be separated by a matrix region 24 that may surround each of pixels 22 and subpixels 26, 28 and 30. (In FIG. 2, matrix region 24 between each of subpixels 26, 28 and 30 is not shown for ease of illustration). Each of pixels 22 may be substantially square in shape and the first, second a third color or subpixel regions may each be substantially rectangular in shape and may each occupy substantially one third of an area of said pixel. Each pixel 22 may extend downwardly through each of layers 16, 18 and 20. Each of pixels 22 may include a plurality of individual color regions, for example, a red color region 26, a green color region 28 and a blue color region 30. Each of regions 26, 28 and 30 may be printed as a single dot or as multiple dots of ink from a printing device (see FIG. 3) during fabrication of color filter 10. Matrix region 24 may be a black color. During use of color filter 10, individual subpixels of color regions 26, 28 and 30 may be activated or deactivated so as to provide a color image on the color filter for viewing purposes.

Each of layers 16, 18 and 20 of color filter 10 are shown having a substantially identical or a redundant color pattern 14. Substantially identical or redundant color patterns of each of the layers of the color filter 10 may be defined as each layer being identical except for immaterial differences with respect to the other layers. Such immaterial differences may include random pixels or portions of pixels (which may be referred to as printed dots) that may not have been properly printed, thereby leaving a defect, such as a hole 32, in a pixel 22 or in a portion of pixel. Such defects, including random missing pixels 22 or portions 26, 28, 30 of pixels 22, in one embodiment, may define a probability of $1 \times 10e-4$, for example, of not being printed. Accordingly, if $1 \times 10e5$ dots are printed in one layer, such as in layer 16, of a color pattern then, on average, 100 dots will either not be printed in that layer or will be printed with some form of defect, i.e., there may be 100 defects 32 in the layer. If a second layer, such as layer 18, is printed on first layer 16, with the same probability of random defects, the number of random defects 32 that will be exactly aligned with a defect in underlying layer 16, may be less than one defect 32 per printed color filter. If a third layer, such as layer 20, is printed on second layer 18, with the same probability of random defects 32, the number of random defects 32 that will be exactly aligned with a defect in both of underlying layers 16 and 18, may be less than $1 \times 10e-12$ per printed filter 10. Accordingly, in one method of reducing defects in a color filter, by using redundant or substantially identical color pattern layers, wherein each of the layers may have a probability of having a number of defects, the number of defects 32 per printed color filter 10 that extends through the entire thickness 10a of each of the multiple layers may be drastically reduced when compared to prior art processes of manufacturing color filters.

In the embodiment shown, the substantially identical color pattern 14 comprises aligned rows 34 and columns 36 of pixels 22 with matrix region 24 separating the pixels and subpixel or color regions, wherein the pattern of pixels 22 in third layer 20 is the same pattern of pixels 22 in second layer 18, which is also the same pattern of pixels 22 in first layer 16. In other words, a red region 26 of a pixel 22 in third layer 20 is aligned with a red region 26 of a pixel 22 in second layer 18, which is in turn aligned with a red region 26 of a pixel 22 in first layer 16.

As shown in FIG. 2, a defect or unprinted dot 32a is shown in second layer 18, below a red region 26a in third layer 20 and above a red region 26a in first layer 16. Due to the multiple layering fabrication process used to manufacture color filter 10 in the present invention, layers 16 and 20 will provide sufficient brightness and color consistency in the region of defect 32a. Stated another way, in a three layered color filter, a defect 32a in one layer will reduce the color saturation and/or increase the brightness of a particular pixel or subpixel region 26a by only approximately 33% because the two layers which are printed in the particular defect region 32a will likely be properly printed. A color saturation reduction and/or brightness increase of only approximately 33%, i.e., a slight color filtering efficiency loss may be sufficient to categorize the pixel 22a as effective and not defective. Accordingly, even though a dot 32a may not be printed within one of the three layers, the particular pixel 22a may provide sufficient color and/or brightness as to be deemed effective.

Similarly, in a two layered color filter, a defect 32a in one layer will reduce the color saturation and/or increase the brightness of a particular pixel or subpixel region 26a by approximately 50% because the remaining layer which is printed in the particular defect region 32a will likely be properly printed. In a four layered color filter, a defect 32a in one layer will reduce the color saturation and/or increase the brightness of a particular pixel or subpixel region 26a by approximately 25% because the remaining three layers which are printed in the particular defect region 32a will likely be properly printed. Accordingly, the probability of random defects in the color filter may be drastically reduced by printing redundant layers of the same color pattern. The number of layers utilized may be any number as desired. However, for high pixel density displays, where a wide viewing angle is desired, it is preferable to minimize the color filter's total thickness, to avoid color and/or brightness changes related to viewing angle. For high pixel density displays, each layer should be as thin as possible, and the minimum number of layers should be chosen that can meet defect and manufacturing yield limits. The thickness 10a of color filter 10 may be chosen based on a percentage of the full colorant value that may be desired. For example, if a 50% brightness of the full colorant value is acceptable, then only two layers may be utilized. If a 67% brightness of the full colorant value is acceptable, then three layers may be utilized. If a 75% brightness of the full colorant value is acceptable, then four layers may be utilized, and so on and so on.

FIG. 3 is a schematic, partial cross-sectional side view of one embodiment of a printer, such as a liquid electro photographic (LEP) printer 60. In the embodiment shown printer 60 includes a body 62 that houses a laser 64, a charge device 66, a photoconductor drum 68, electrostatic color developers 70, an intermediate transfer drum 72 and an impression cylinder 74. In one example embodiment, color developers 70 may include red toner 70a, blue toner 70b, green toner 70c and black toner 70d. Of course, any number and any mix of colors may be utilized.

In use, charge device 66 places a uniform coating of charge on drum 68. Laser 64 then sweeps across drum 68 to create a latent image. One of the electrostatic color developers 70 is then moved from a retracted to an engaged position adjacent drum 68 and deposits toner across the surface of drum 68 as the drum is rotated. The toner is attached to uncharged areas of drum 68 and is repelled by charged areas of drum 68 to form a layer of one color, such as a layer of red color from toner 70a. The layer is then transferred to transfer drum 72. The process is then repeated to form as many redundant layers of the particular color toner as is desired wherein after each layer is positioned on drum 68, the layer is transferred to intermediate drum 72. The same process is then repeated for a second color, a third color, and so on until a solid pattern having as many colors and as many redundant layers as desired, is positioned on intermediate transfer drum 72.

When the desired number of colors and redundant layers is positioned on intermediate transfer drum 72, such as layers 20, 18 and 16, each layer including color regions 26, 28, and 30, and matrix region 24; the image is transferred to a substrate 12 (see FIG. 1) that is moved between transfer drum 72 and impression cylinder 74 to form color filter 10 (see FIG. 1). Each of layers 20, 18 and 16 may include a defect 32, such as a hole. However, due to the use of multiple layers, and due to the probability that the defects in each of the individual layers will not be aligned with one another, a solid color pattern is formed on substrate 12.

In other embodiments, printer 60 may be a dry electro photographic printer. In still other embodiments, a combination of lithographic and deposition techniques may be utilized to form the multiple layers of color filter 10.

In one embodiment, a width 50 of drum 68 may define a maximum width 52 (see FIG. 1) of color filter 10. For example, width 50 of drum 68 may be approximately fifteen inches such that a single color filter 10 having a width 52 (see FIG. 1) of approximately fifteen inches and a length 53 of approximately nine inches, for example, may be printed by printer 40. Accordingly, color filter 10 may be manufactured individually in a relatively small fabrication area. In another way of describing a size of color filter 10, the color filter may be formed having a height and width aspect ratio of 3×4, 9×16, or any other aspect ratio as may be desired.

FIG. 4 is a schematic partial cross-sectional side view of one embodiment of a printer 40 utilized for printing a color filter 10 (see FIG. 1A). Printer 40, in the embodiment shown, includes a printhead 42 for printing ink 44 though the nozzles of an orifice plate 46 onto substrate 12. Ink 44 may include pigment, dye, polymers, or any other component as desired for a particular application. Printhead 42 may include a chamber divided into, for example, four compartments for holding four different types or colors of ink therein. In the embodiment shown, red ink 44a, green ink 44b, blue ink 44c and black ink 44d may be contained with printhead 42 and may be printed by the printhead 42 through orifice plate 46. In another embodiment, ink 44 may be contained in an ink cartridge or ink container positioned remote or off-axis from printhead 42.

During printing of color filter 10, a layer 16 may be printed on substrate 12. Layer 16 may be printed with multiple passes to define each of individual color regions 26, 28 and 30 and matrix region 24 (one such set of color regions 24, 26, 28 and 30 is shown for ease of illustration). In another embodiment, the entirety of layer 16 may be printed in a single pass utilizing different nozzles of orifice plate 46 to print the individual inks 44a-44d to define color regions 24, 26, 28 and 30. During printing of layer 16, one or more defects 32 may be printed in layer 16 (only one defect 32 is shown in cross-section for ease of illustration).

After printing of layer 16 on substrate 12, layer 18 may be printed directly on layer 16. Layer 18 may be more easily printed on layer 16 than on substrate 12 such that layer 18 may have fewer defects 32 than printed layer 16 (only one defect 32 is shown in cross-section for ease of illustration). Layer 18 may be more easily printed on layer 16 than on substrate 12 (or on drum 68 as shown in FIG. 3) because the toner material of the color pattern may more easily adhere to an underlying toner layer than to a surface of different material, such as the surface of substrate 12 or drum 68. Accordingly, in a second method of reducing defects in a color filter, multiple layers are formed wherein the second and any succeeding layers may have a probability of fewer defects than an initial layer that is deposited directly on a substrate or on a drum. Additionally, any defects 32 within layer 18 have a large probability of not being aligned with any defects 32 within layer 16. Accordingly, after printing of layer 18 on layer 16, substrate 12 will likely be completely covered with a solid film, i.e., a film without defects that extend completely through both layers 18 and 16 that define color pattern 14 positioned on substrate 12 at that time. Moreover, the color pattern of layer 18 may be aligned with the color pattern of layer 16 such that individual color regions 26, 28 and 30 and matrix region 24 (one such set of individual color regions is shown for ease of illustration) will be aligned with a corresponding individual color region in layer 16.

After printing of layer 18 on layer 16, layer 20 may be printed directly on layer 18. Layer 20 may be more easily printed on layer 18 than on substrate 12 such that layer 20 may have fewer defects 32 than printed layer 16. Any defects 32 within layer 20 have a large probability of not being aligned with any defects 32 within layers 18 or 16. Accordingly, after printing of layer 20 on layer 18, drum 48 will more likely be completely covered with a solid film, i.e., a film without defects that extend completely through the three layers that define color pattern 14 at that time. Moreover, the color pattern of layer 20b may be aligned with the color pattern of layers 18 and 16 such that individual color regions 26, 28 and 30 and matrix region 24 (one such set of individual colors regions is shown for ease of illustration) will be aligned with a corresponding individual color region in layers 18 and 16. In such an embodiment, three layers 16, 18 and 20 are positioned on substrate 12 and will likely define very few, if any, defects 32 that extend completely through each of the three layers.

In this manner, color filter 10 may be manufactured without requiring a vacuum, masking, etching, or other fabrication steps currently utilized in the prior art lithographic fabrication process. Moreover, due to the use of multiple layers, such as two or more layers within color pattern 14, any defects in the film will likely extend through a single layer. At any given location within color pattern 14, therefore, at least one layer will likely be present. Accordingly, color filter 10 provides greater defect tolerance and more uniform brightness and color than prior art color filters. In particular, the method of manufacturing color filter 10 may reduce defects in two distinct ways. First, the use of multiple layers will likely result in the covering of defects in lower levels such that a solid patterned layer may extend across the color filter. Second, the use of multiple layers will likely result in a redundant layer or layers more readily adhering to underlying layers thereby providing an upper layer having less defects than a lowermost layer. Moreover, printer 40 may have a width 50 that corresponds with the dimension of one side of a single display, such that color filter 10 may be manufactured in a small work area.

FIG. 5 is a schematic front view of one embodiment of an image display device 74 that includes one embodiment of color filter 10. Image display device 74 may comprise a electronic computer monitor, a television set, a liquid crystal display, or any type of image display device that may utilize a color filter. In this embodiment, color filter 10 may be approximately fifteen inches by nine inches in size. However, color filter 10 may be printed in any size for a particular application.

Other variations and modifications of the concepts described herein may be utilized and fall within the scope of the claims below.

We claim:

1. A method of making a color filter, comprising:
   printing a first layer of a pattern on a drum, said pattern including a plurality of pixels, each pixel including a plurality of individual color regions;
   printing a second layer of said pattern on said first layer, said second layer being substantially identical to said first layer; and
   simultaneously transferring said first and second layers to a substrate.

2. The method of claim 1 wherein said drum comprises one of a liquid electro photographic drum and a dry electro photographic drum.

3. The method of claim 1 wherein said individual color regions of said first layer of said pattern are each printed sequentially until said pattern of said first layer comprises a continuous film, and thereafter, said individual color regions of said second layer of said pattern are each printed sequentially until said pattern of said second layer comprises a continuous film.

4. The method of claim 1, prior to said transferring, further comprising printing a third layer of said pattern on said second layer, said third layer being substantially identical to said second layer and, thereafter, transferring said first, second and third layers to said substrate.

5. The method of claim 1 wherein said individual color regions include a red region, a green region and a blue region.

6. The method of claim 1 wherein said first and second layers are printed with ink including one of a pigment and a dye.

7. The method of claim 1 wherein said color filter is a component of a liquid crystal display device.

8. A method of making a color filter, comprising:
   forming a first layer of a color filter pattern including a plurality of individual color regions;
   forming on said first layer a second layer of said color filter pattern including a plurality of individual color regions, wherein said second layer is substantially identical to said first layer such that defects present in said first layer are covered by said second layer, and wherein said second layer is formed on said first layer in a same direction as said first layer; and
   simultaneously transferring said first and second layers to a substrate.

9. The method of claim 8 wherein said first layer is formed on a drum and thereafter said first and second layers are transferred to said substrate.

10. The method of claim 8 further comprising forming on said second layer a third layer of said color filter pattern including a plurality of individual color regions, wherein said third layer is substantially identical to said second layer such that defects present in said second layer are covered by said third layer.

11. The method of claim 8 wherein said color filter pattern is not symmetrical about a center point of said color filter pattern.

12. A method of reducing defects in a color filter, comprising:
   forming a first layer of a color pattern, said first layer defining a first defect density;
   forming a second layer of said color pattern on said first layer in a same orientation as said first layer, said second layer defining a second defect density at most the same as said first defect density,
   wherein said color pattern includes a third defect density less than said first defect density and said second defect density; and
   simultaneously transferring said first and second layers to a substrate.

13. A method of reducing defects in a color filter, comprising:
   forming a first layer of a color pattern, said first layer defining a first defect density; and
   forming a second layer of said color pattern on said first layer, said second layer defining a second defect density less than said first defect density,
   wherein said color pattern includes a third defect density less than said first defect density and said second defect density, and
   wherein said first and second layers are simultaneously positioned on a substrate.

* * * * *